United States Patent
Chen et al.

(10) Patent No.: US 8,256,853 B2
(45) Date of Patent: Sep. 4, 2012

(54) OPENING DEVICE FOR A SLIDE ASSEMBLY

(75) Inventors: Ken-Ching Chen, Kaohsiung Hsien (TW); Xue-Long Liu, Kaohsiung Hsien (TW); Chun-Chiang Wang, Kaohsiung Hsien (TW)

(73) Assignee: King Slide Works Co., Ltd., Kaohsiung Hsien (TW)

( * ) Notice: Subject to any disclaimer, the term of this patent is extended or adjusted under 35 U.S.C. 154(b) by 347 days.

(21) Appl. No.: 12/748,696

(22) Filed: Mar. 29, 2010

(65) Prior Publication Data

US 2011/0235952 A1    Sep. 29, 2011

(51) Int. Cl.
*A47B 88/04* (2006.01)

(52) U.S. Cl. .................. 312/333; 312/334.47; 312/319.1

(58) Field of Classification Search ............... 312/319.1, 312/330.1, 334.1, 334.7, 334.8, 334.44, 334.46, 312/334.47, 333; 384/20, 21, 22
See application file for complete search history.

(56) References Cited

U.S. PATENT DOCUMENTS

| | | | |
|---|---|---|---|
| 5,040,833 A | 8/1991 | Brunnert | |
| 7,347,515 B1 | 3/2008 | Lu | |
| 7,374,261 B1 | 5/2008 | Wang | |
| 7,413,270 B2 | 8/2008 | Chang et al. | |
| 7,537,296 B2 | 5/2009 | Leon et al. | |
| 8,100,487 B2 * | 1/2012 | Liang et al. | 312/333 |
| 2008/0197759 A1 * | 8/2008 | Chen et al. | 312/334.1 |

FOREIGN PATENT DOCUMENTS

EP    0743032 B1    11/1996

* cited by examiner

*Primary Examiner* — James O Hansen
(74) *Attorney, Agent, or Firm* — Rosenberg, Klein & Lee (57) ABSTRACT

An opening device for a slide assembly includes a swing member with a pin portion, a first resilient member and a pusher connected to the first rail. The first resilient member applies a force to the pusher. An engaging member pivotably connected to the second rail and includes a block and a positioning leg contacting a portion of the second rail. The engaging member is connected to a second resilient member. When the second rail is retracted relative to the first rail, the block of the engaging member contacts the pin portion of the swing member. When a pull force is applied to the retracted second rail, the engaging member swings an angle on the second rail to disengage the block from the pin portion of the swing member, and the engaging member returns to its original position relative to the second rail.

9 Claims, 10 Drawing Sheets

OPENING DEVICE FOR A SLIDE ASSEMBLY

FIELD OF THE INVENTION

The present invention relates to an opening device for a slide assembly, and more particularly, to an opening device which is activated by a pushing action, and the slide assembly is returned to initial status after the slide assembly is forced to open.

BACKGROUND OF THE INVENTION

U.S. Pat. No. 5,040,833 to Brunnert discloses a closing device for drawers and includes a drawer installed to a piece of furniture and the drawer is movable between a closed position and an opened position. A spring is located between the drawer and the furniture. A switch device is connected to the furniture and includes a holding member which includes a hook, and a latch member is connected to the drawer. When the drawer is in its closed position, the latch member is engaged with the hook of the holding member. The latch member includes at least one upper portion which defines two guide tracks to guide the holding member. When the drawer is opened or closed relative to the furniture, the holding member is bent by the guide tracks. When the drawer is pulled out from the furniture by force, the holding member is bent upward so that the hook is disengaged from the latch member. When the force pushes the drawer to its closed position, the hook is movable and releases the engagement with the latch member so that the drawer responses the resilient force and pops out from the furniture.

U.S. Pat. No. 7,374,261 to Wang discloses a push-open type slide structure which comprises a top fastener and a locking device mounted between an outer slide rail and a pull rod. The top fastener comprises a loading plate extending from one side of a center portion of the main body thereof. Two pillars extend from both sides of the main body respectively. An action trench is formed on a connection portion between the main body and the loading plate. The action trench is in communication with a holding trench on the backside of the main body. A second elastic device is mounted on the inside of said holding trench. The loading plate has a shaft hole and a slideway on a surface and slide rails on the backside of the loading plate. The positioning fastener has a shaft and a protrudent part on a bottom surface, a hook on an inner edge, and a guide pillar on a rear end. The shaft of the positioning fastener is held in the shaft hole. The protrudent part is exactly coupled, with the inside of said slideway. The hook is inserted into said action trench of the main body and coupled with the second elastic device. The pair of first elastic device is sleeved onto the pillars of the main body. Two sleeves are mounted on both sides of the slide sleeve and coupled with the pair of first elastic devices respectively. The slide sleeve is coupled with a lower portion of the loading plate. The slide sleeve is slidable on the slide rails of the loading plate. The locking device is fixed on said pull rod. The locking device has a connection part for coupling with a guide part and a shaft holder. The guide part of the locking device has a guide edge, an inclined plane, and a recessed trench. The shaft holder has an edge protrusion spaced from the recessed trench by a certain distance so as to a form a tunnel.

Both Brunnert and Wang disclose a means to prevent from damage when the drawer is forced to open. The means for Brunnert uses the upward bending of the holding member to disengage the hook from the latch member. Wang uses the space located beneath the guide pillar so as to allow deformation of the holding trench such that the pillars can be disengaged from the locking device. However, both disclosures use the flexibility to achieve the disengagement and wearing happens during operation and may cause permanent deformation to the relative parts and this reduces the lift of use of the whole slide assembly.

The present invention intends to provide an opening device for slide assembly and the opening device of the present invention improves the inherent shortcomings of the conventional disclosures.

SUMMARY OF THE INVENTION

The primary object of the present invention is to provide an opening device for a slide assembly wherein the slide assembly can be opened by pushing action.

Another object of the present invention is to provide an opening device for a slide assembly wherein when the slide assembly is pulled by an improper force, the parts of the opening device are not damaged.

The present invention relates to an opening device for a slide assembly and comprises a first rail and a second rail which is movable in longitudinal direction relative to the first rail. A stationary member is fixed to the first rail and comprises a first end and a second end which is located opposite to the first end. A longitudinal portion is located between the first and second ends. A swing member is pivotably connected to the second end of the stationary member and comprises a pin portion. A pusher is longitudinally connected to the longitudinal portion of the stationary member and a first resilient member is connected to the pusher.

An engaging member is pivotably connected to the second rail and comprises a first end and a second end which is located opposite to the first end. A first wall, a second wall, a third wall, a connection wall, a block and a positioning leg are located between the first and second ends. The connection wall extends from the first end and is connected to the first wall. The second wall and the third wall, the first wall and the block define a first path. The block and the third wall define a second path. The block has an engaging surface and a guide portion defined in two ends thereof. The first wall, the second wall and the connection wall define a first slot. The second wall, the third wall and the connection wall define a second slot which faces the second path. The first wall comprises a first guide surface facing a portion of the first path which is located corresponding to a portion of the first slot. The second wall comprises a second guide surface facing the engaging surface of the block. The engaging surface extends an inclined surface which faces a portion of the first slot. The third wall comprises a third guide surface. The positioning leg extends from the second end of the engaging member and contacts a portion of the second rail. A second resilient member is connected between the first end of the engaging member and the second rail.

When the second rail is retracted relative to the first rail, the engaging surface of the block of the engaging member is engaged with the pin portion of the swing member. When the second rail is pulled out relative to the first rail, the engaging member overcomes a force between the second resilient member and the positioning member, and swings an angle on the second rail. The engaging surface of the block of the engaging member is then disengaged from the pin portion of the swing member. The positioning leg and the second resilient member return the engaging member relative to the second rail.

The device further comprises a third rail which is longitudinally slidable between the first and second rails.

The longitudinal portion includes a groove in the stationary member so as to form a rail body. The longitudinal portion includes a recessed installation portion and the pusher includes a guide slot with which the rail body is engaged.

The second end of the stationary member has a base portion extending therefrom which includes a hole and the swing member has a shaft which is pivotably connected to the hole.

The second end of the stationary member has a restriction portion extending therefrom which includes a restriction slot and the swing member has a tongue which is inserted into the restriction slot.

The swing member has a reinforcement member extends through the pin portion.

The device further comprises a connection member which is connected to the stationary member and includes a link and a head which is fixed to an end of the link. The first resilient member is mounted to the link and the pusher includes an aperture through which the link extends so that the pusher is biased by the first resilient member.

The engaging member includes first contact portion and the second rail includes a second contact portion which is located corresponding to the first contact portion. The first contact portion contacts a portion of the second contact portion.

The second rail includes a second contact portion which includes a protrusion and the positioning leg contacts the protrusion.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
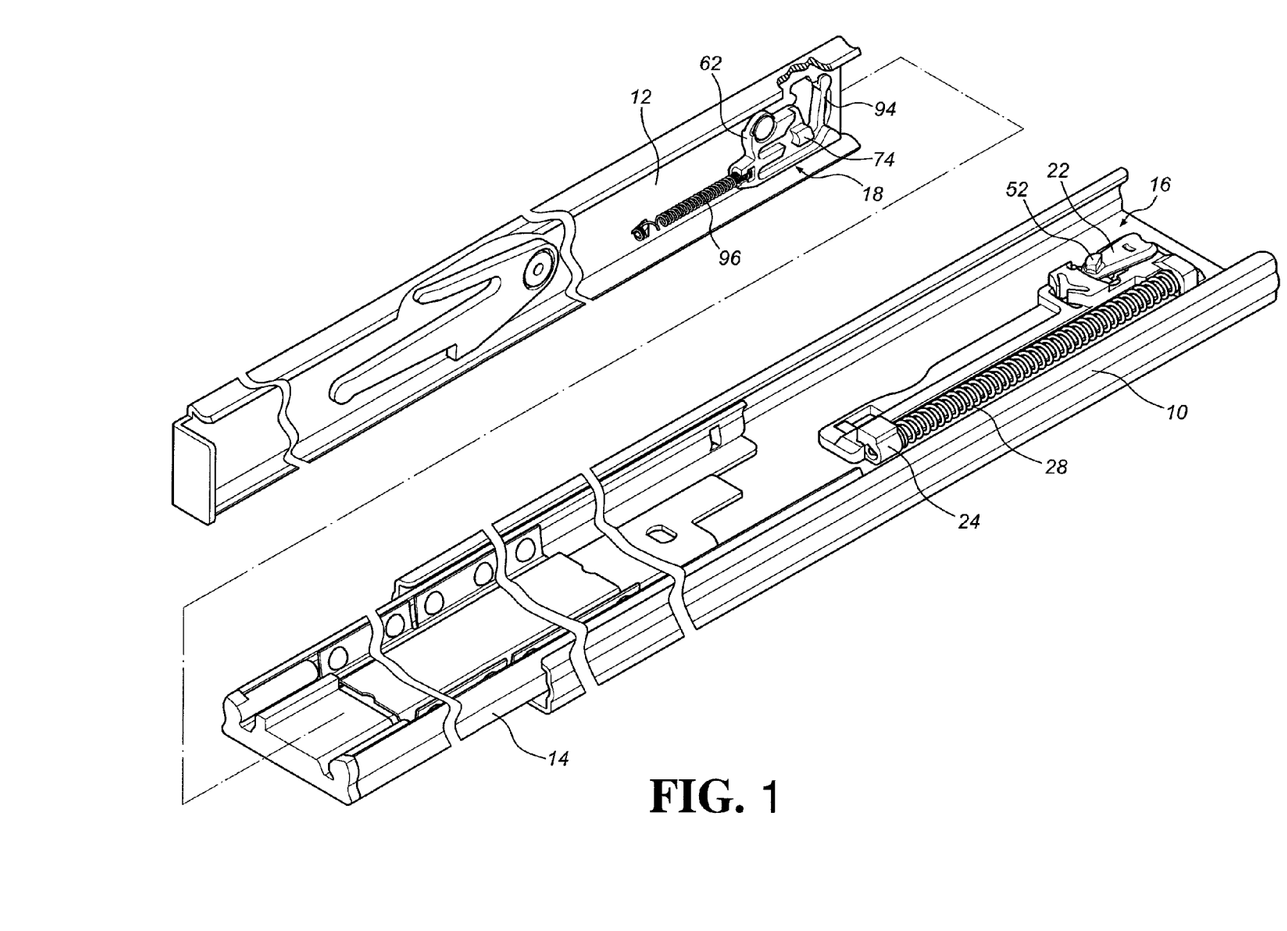
FIG. 1 shows that the opening device of the present invention is installed to the slide assembly.

Referring to FIG. 1, the slide assembly comprises a first rail 10 and a second rail 12 which is movable in longitudinal direction relative to the first rail 10. A third rail 14 is longitudinally slidable between the first and second rails 10, 12, such that the second rail 12 can be pulled out relative to the first rail 10 to a longer distance by the third rail 14. An opening unit 16 is connected to the first rail 10 and an engaging unit 18 is connected to the second rail 12. By the actions of retracting or pushing, the engaging unit 18 is engaged with the opening unit 16, or the engaging unit 18 is disengaged from the opening unit 16.

Figure 2:
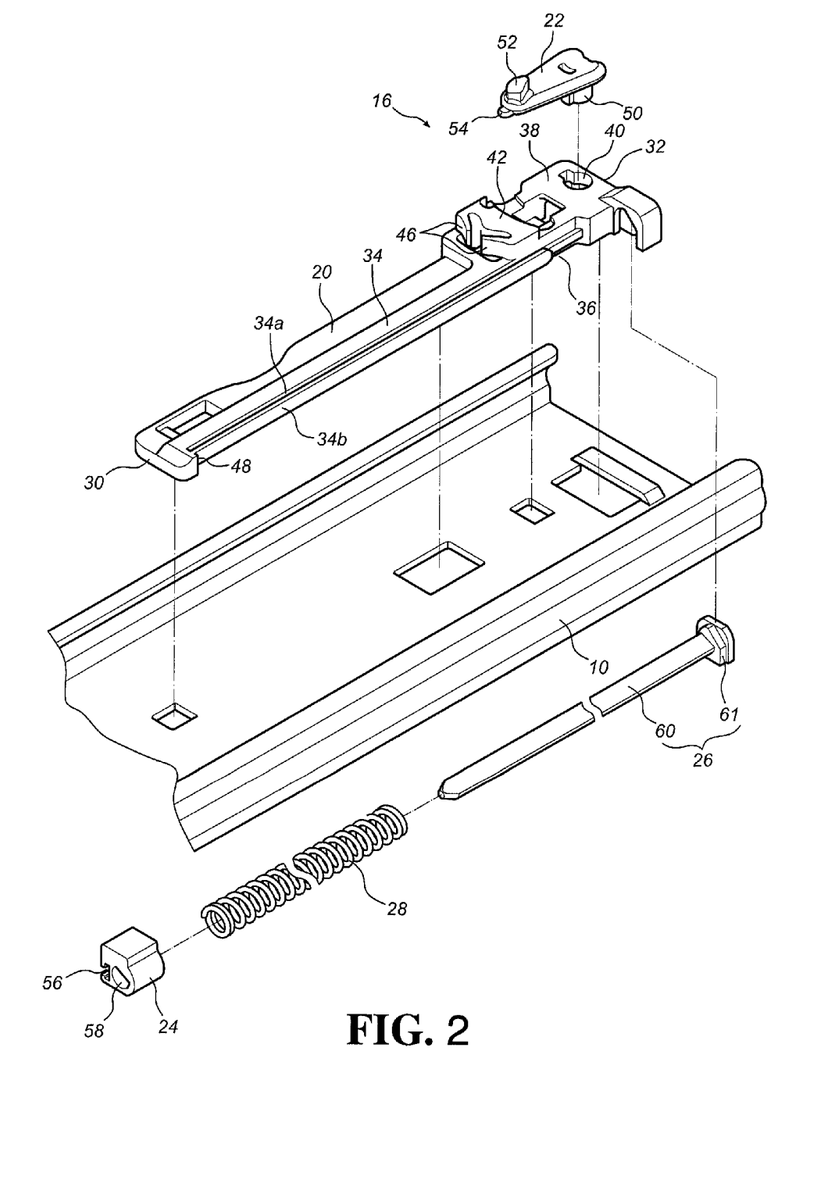
FIG. 2 is an exploded view to show the opening unit of the present invention and the first rail.

FIG. 2 shows that the opening unit 16 includes a stationary member 20 fixed to the first rail 10, a swing member 22 is pivotably connected to the stationary member 20, a pusher 24 is longitudinally and movably connected to the stationary member 20, a connection member 26 is connected to the stationary member 20, a first resilient member 28 is installed between the stationary member 20 and the pusher 24.

Figure 3:
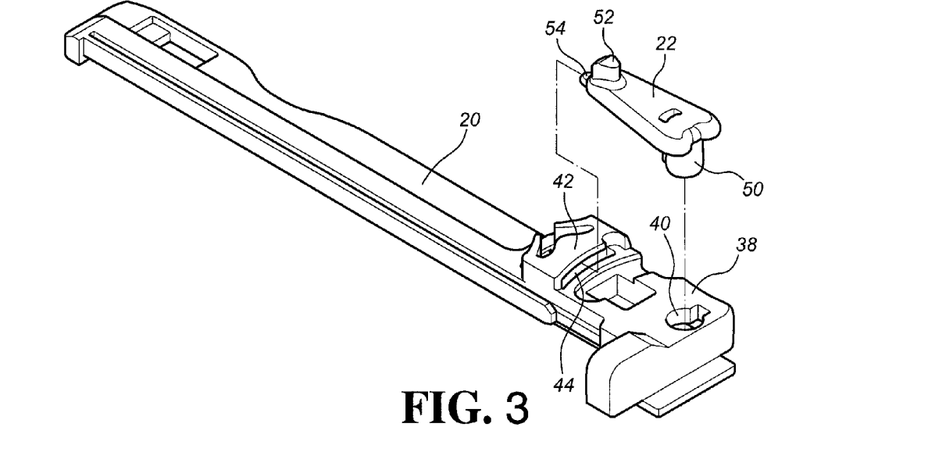
FIG. 3 shows the swing member and the stationary member of the opening device of the present invention.

The stationary member 20 comprises a first end 30, a second end 32 which is located opposite to the first end 30 and a longitudinal portion 34 which is located between the first and second ends 30, 32 of the stationary member 20. Preferably, the longitudinal portion 34 includes a groove 34a in the stationary member 20 so as to form a rail body 34b. The longitudinal portion 34 includes a recessed installation portion 36 and the pusher 24 includes a guide slot 56 which is engaged with the rail body 34b by installing the pusher 24 from the installation portion 36. The second end 32 of the stationary member 20 has a base portion 38 extending therefrom which includes a hole 40. A restriction portion 42 extends from the base portion 38 as shown in FIG. 3 and includes a restriction slot 44. A buffering portion 46 extends from the restriction portion 42 and toward the first end 30 of the stationary member 20. The buffering portion 46 can absorb the impact of the end of the third rail 14. A stop 48 extends from the first end 30 of the stationary member 20 and is located corresponding to the longitudinal portion 34 so as to restrict the travel distance of the pusher 24.

Figure 4:
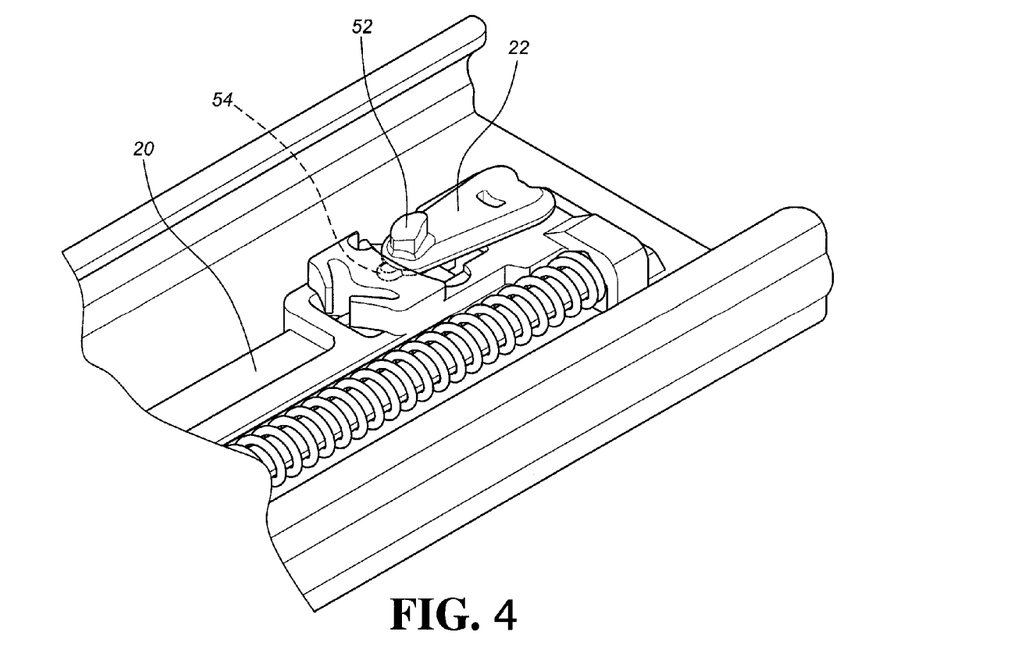
FIG. 4 shows the swing member is connected to the stationary member of the opening device of the present invention.
Figures 5, 6:
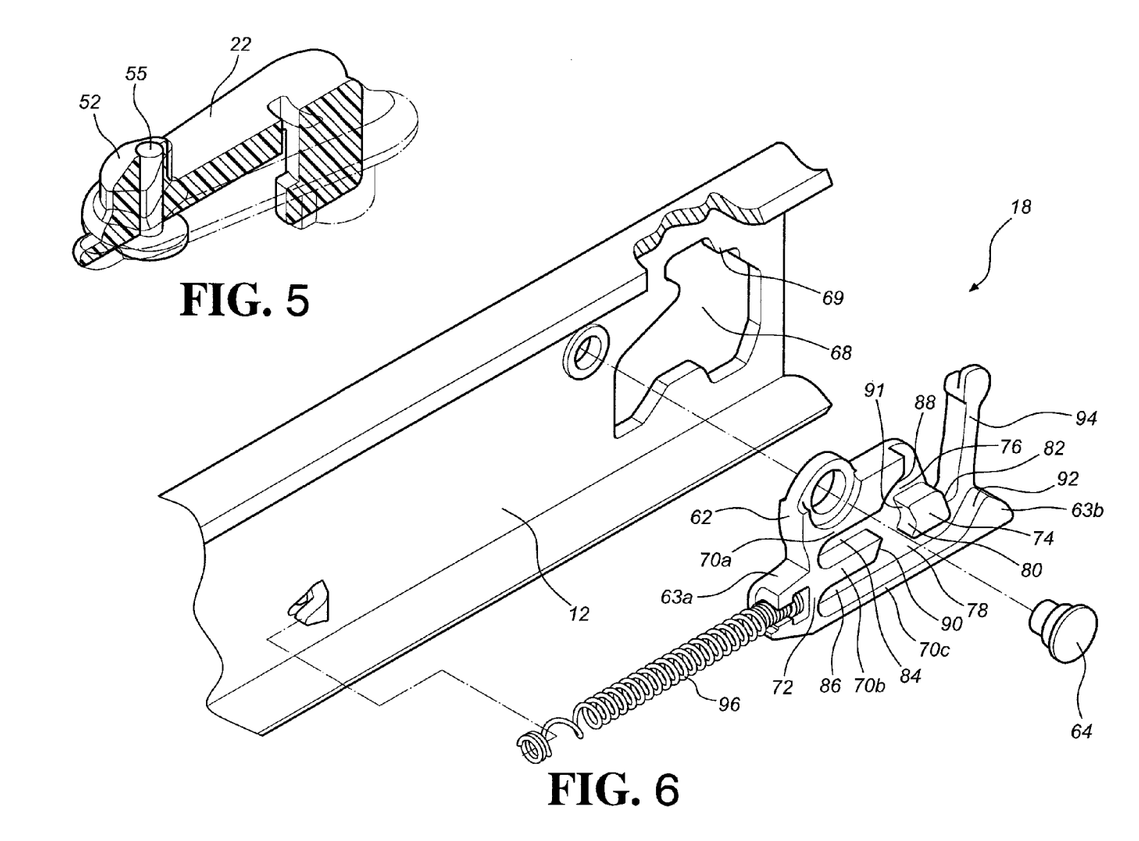
FIG. 5 shows that a reinforcement member is connected with the swing member.
FIG. 6 is an exploded view of the engaging unit and the second rail.

The swing member 22 has a shaft 50 which is pivotably connected to the hole 40 of the base portion 38. The swing member 22 includes a pin portion 52 and a tongue 54, wherein the pin portion 52 protrudes a height from the swing member 22 and the tongue 54 is inserted into the restriction slot 44 to restrict the movement of the swing member 22 as shown in FIGS. 3 and 4. The swing member 22 may have a reinforcement member 55 extends through the pin portion 52 as shown in FIG. 5.

The guide slot 56 of the pusher 24 is engaged with the rail body 34b so that the pusher 24 can only move along the longitudinal portion 34. The pusher 24 includes an aperture 58 which is located corresponding to the connection member 26 which is mounted to the pusher 24.

The connection member 26 is connected to the stationary member 20 and its length is substantially the same as the distance between the first and second ends 30, 32 of the stationary member 20. In this embodiment, the connection member 26 includes a link 60 and a head 61 which is fixed to an end of the link 60. The first resilient member 28 is mounted to the link 60 and the pusher 24 includes an aperture 58 through which the link 60 extends so that the pusher 24 is biased by the first resilient member 28. The head 61 is connected to the base portion 38 of the stationary member 20. In another embodiment, the connection member 26 can be integrally formed with the stationary member 20.

The first resilient member 28 has one end contacting the head 61 so that the link 60 of the connection member 26 extends through the aperture 58 of the pusher 24 and the head 61 is positioned at the base portion 38. The pusher 24 is always biased by the first resilient member 28.

Figure 7:
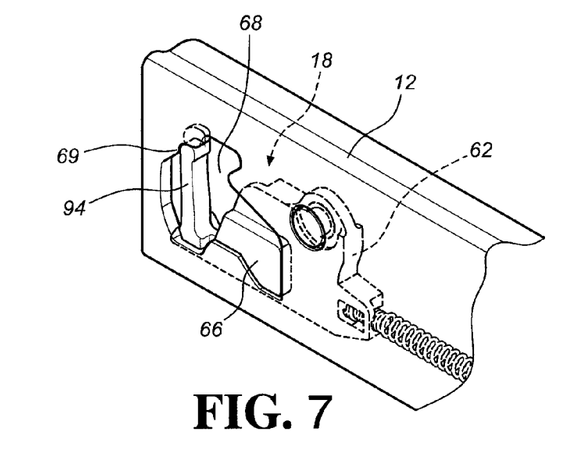
FIG. 7 shows that the engaging unit is installed to the second rail.

As shown in FIGS. 6 and 7, the engaging unit 18 is connected to the second rail 12 and includes an engaging member 62 which is pivotably connected to the second rail 12 by a pivot 64. The engaging member 62 includes a first contact portion 66 and the second rail 12 includes a second contact portion 68 which is an opening with specific shape and located corresponding to the first contact portion 66. The second contact portion 68 is larger than that of the first contact portion 66 so that the first contact portion 66 contacts a portion of the second contact portion 68. The second contact portion 68 includes a protrusion 69. In this embodiment, the engaging member 62 comprises a first end 63a and a second end 63b which is located opposite to the first end 63a. A first wall 70a, a second wall 70b, a third wall 70c, a connection wall 72, and a block 74 are located between the first and second ends 63a, 63b. The connection wall 72 extends from the first end 63a and is connected to the first wall 70a, the second wall 70b and the third wall 70c. The first wall 70a and the block 74 define a first path 76. The block 74 and the third wall 70c define a second path 78. The block 74 includes an engaging surface 80 and a guide portion 82 defined in two ends thereof. The first wall 70a, the second wall 70b and the connection wall 72 define a first slot 84. The second wall 70b, the third wall 70c and the connection wall 72 define a second slot 86 which faces the second path 78. The first wall 70a comprises a first guide surface 88 which faces a portion of the first path 76. The first path 76 is located corresponding to a portion of the first slot 84. The second wall 70b comprises a second guide surface 90 which faces the engaging surface 80 of the block 74. The engaging surface 80 includes an inclined surface 91 extending therefrom which faces a portion of the first slot 84. The third wall 70c comprises a third guide surface 92. The opening device further includes a positioning leg 94 which extends from the second end 63b of the engaging member 62 and contacts the protrusion 69 of the second contact portion 68 of the second rail 12. When the engaging member 62 is pivoted an angle, the contact between the positioning leg 94 and the protrusion 69 of the second contact portion 68 provides a resistance such that the pivotal action of the positioning leg 94 has to overcome the resistance. When the force to pivot the positioning leg 94 is disappeared, an elastic force generated from the positioning leg 94 brings the engaging member 62 back to its original position. Alternatively, a second resilient member 96 is connected between the first end 63a of the engaging member 62 and the second rail 12, so that the force of the second resilient member 96 can bring the engaging member 62 back to its original position.

Figure 8:
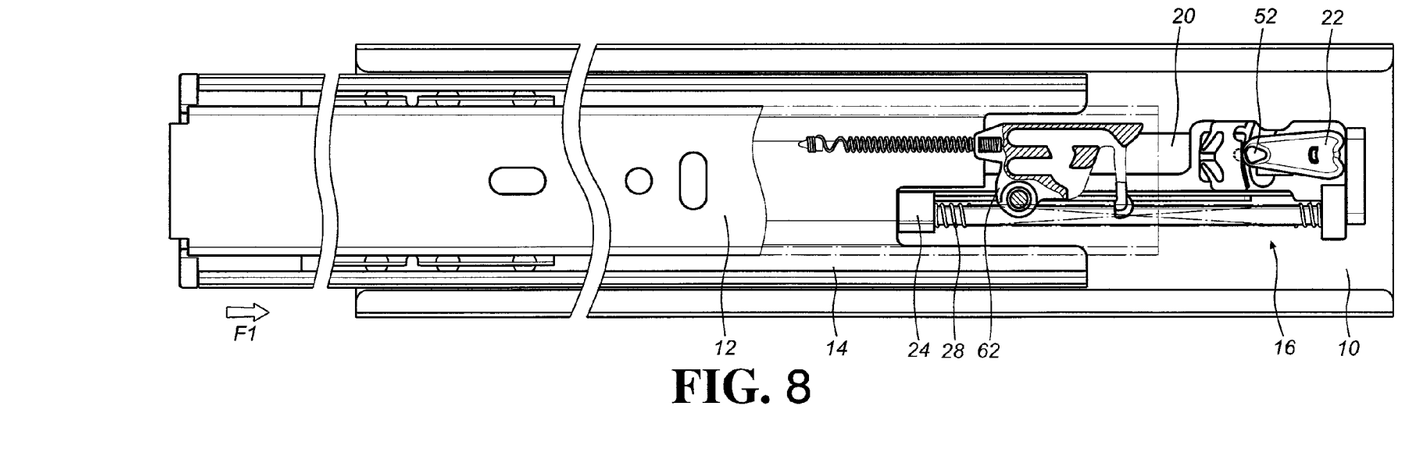
FIG. 8 shows that a push force is applied to make the opening unit contact the engaging unit.
Figure 9:
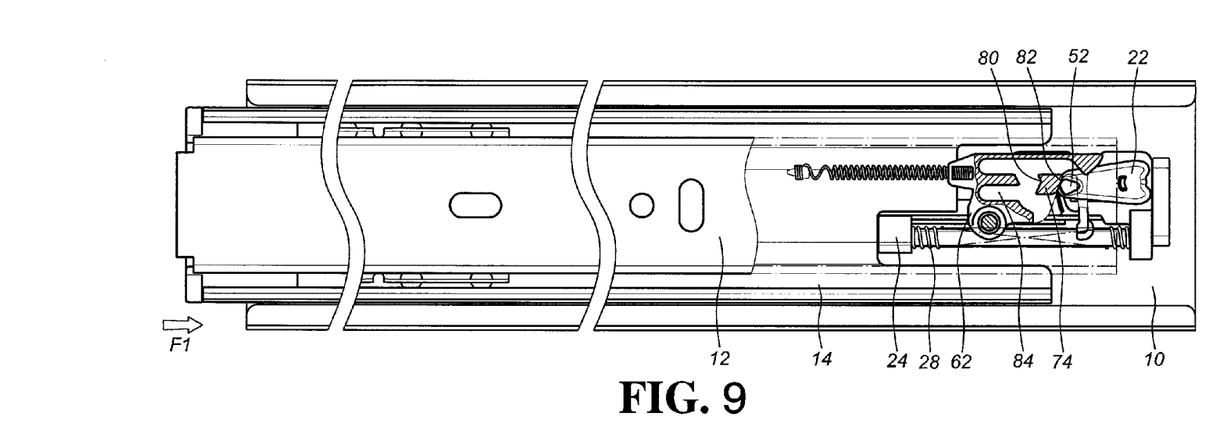
FIG. 9 shows that the push force engages the pin portion of the swing member with the block of the engaging member.
Figure 10:
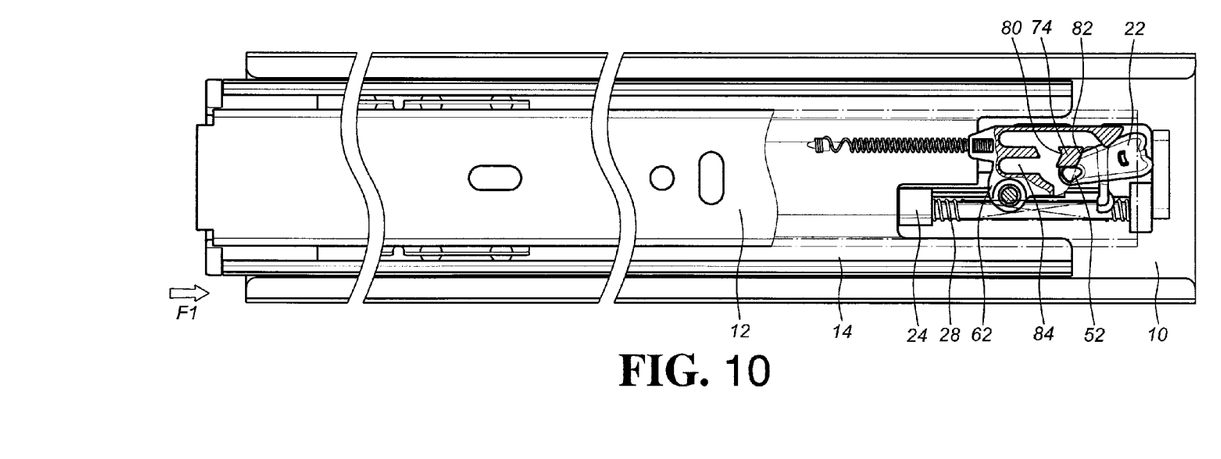
FIG. 10 shows the continuing action followed by the action disclosed in FIG. 9.
Figure 11:
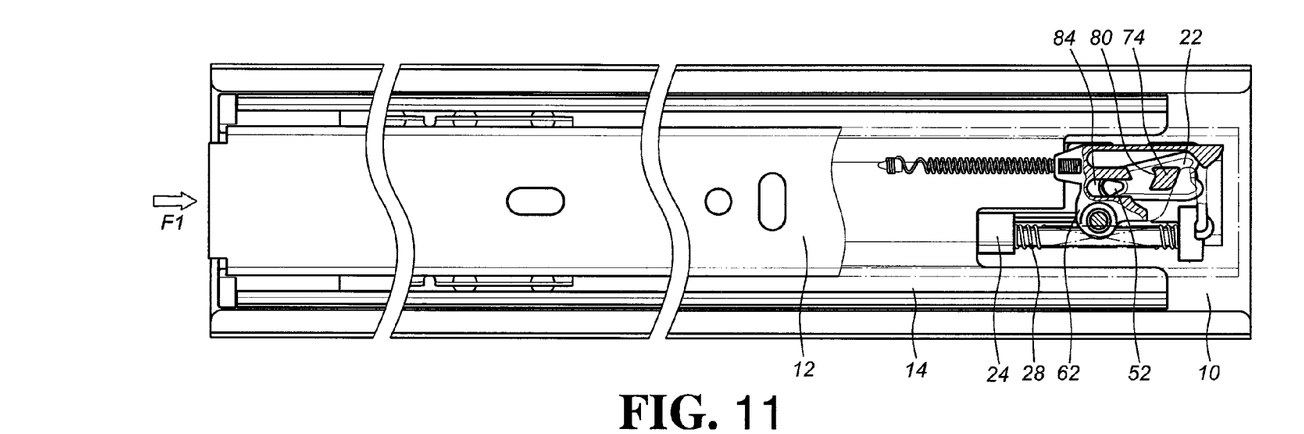
FIG. 11 shows the continuing action followed by the action disclosed in FIG. 10.
Figure 12:
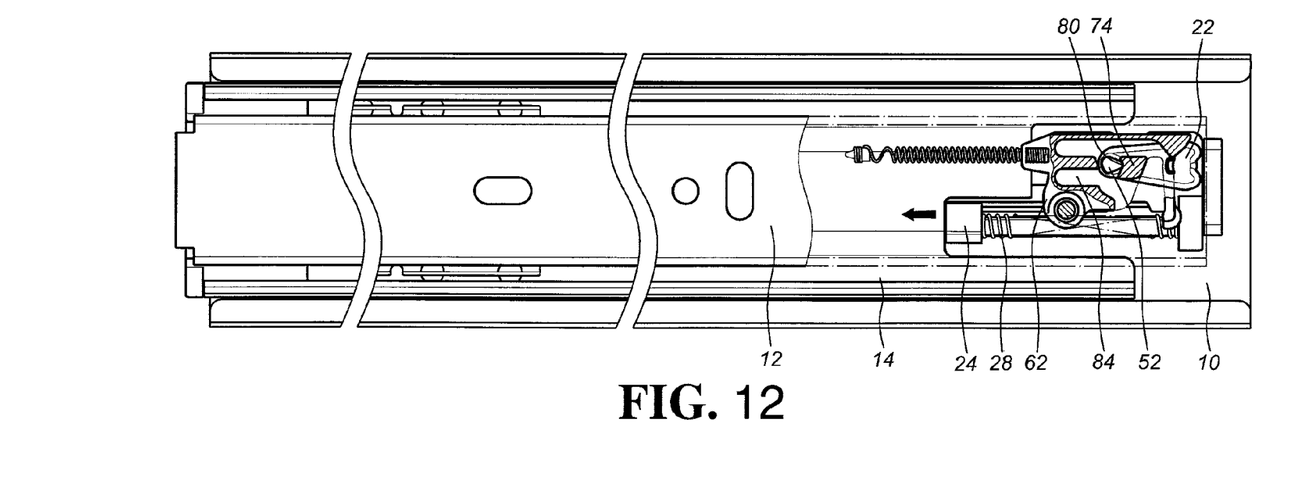
FIG. 12 shows that the push force is released and the pin portion of the swing member is engaged with the block.

FIGS. 8-12 show that the second rail 12 is retracted relative to the first rail 10, and the third rail 14 is retracted relative to the first rail 10 by the second rail 12. The pusher 24 of the opening unit 16 is pushed toward the retraction direction by the third rail 14 with a force F1. The first resilient member 28 is compressed along with the movement of the pusher 24 and generates a force applied to the third rail 14 or the second rail 12, as shown in FIG. 8. When the second rail 12 is further retracted relative to the first rail 10, as shown in FIGS. 9-11, the pin portion 52 of the swing member 52 is guided by the guide portion 82 of the block 74 and enters into the first slot 84 of the engaging member 62. When the push force applied to the second rail 12 is released, the second rail 12 responses the force of the first resilient member 28 and moves backward relative to the first rail 10 as shown in FIG. 12. The engaging surface 80 of the block 74 is engaged with the pin portion 52 of the swing member 22. In this status, the second rail 12 is retracted relative to the first rail 10 and the pusher 24 applies a stored force which can be used to pop out the second rail 12 relative to the first rail 10.

Figure 13:
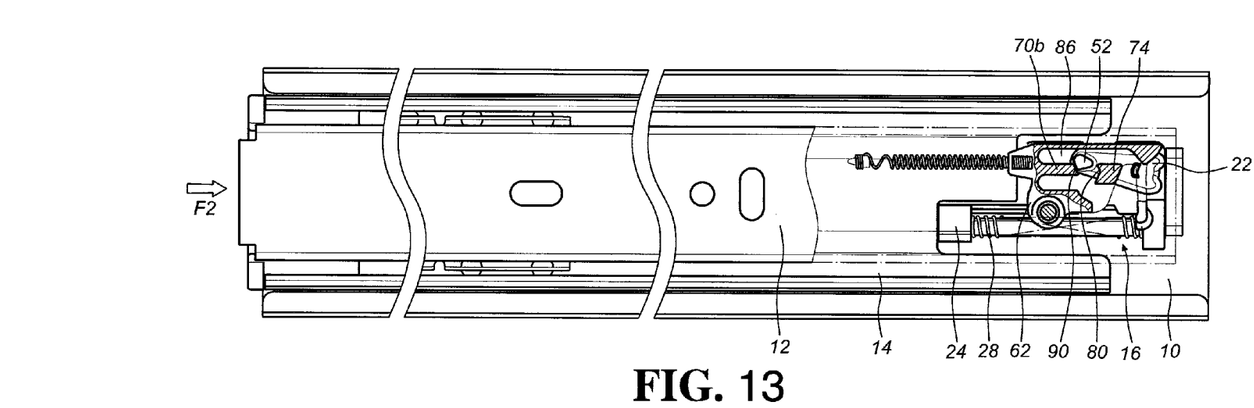
FIG. 13 shows that a push force disengages the pin portion of the swing member from the block of the engaging member.
Figure 14:
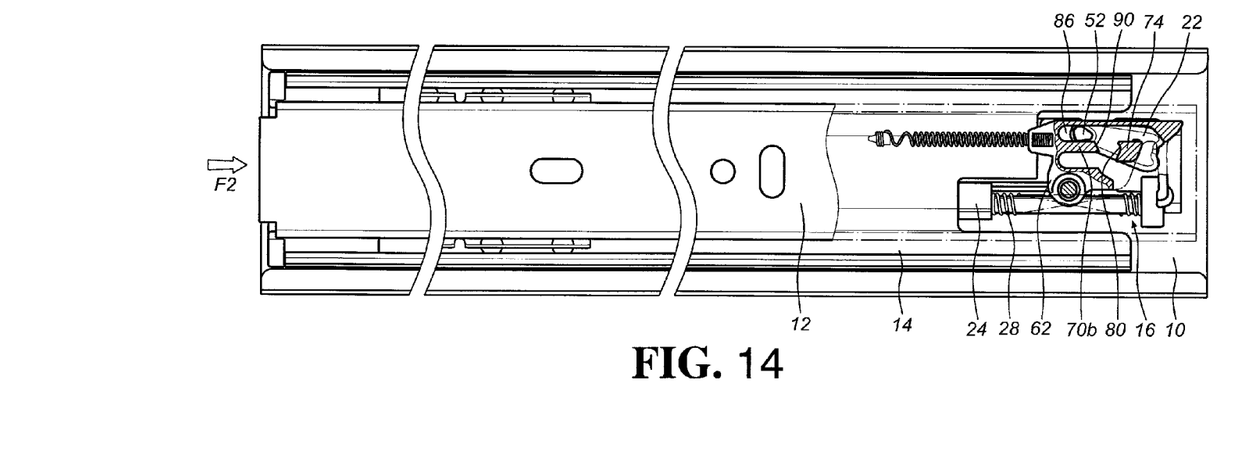
FIG. 14 shows the continuing action followed by the action disclosed in FIG. 13.
Figure 15:
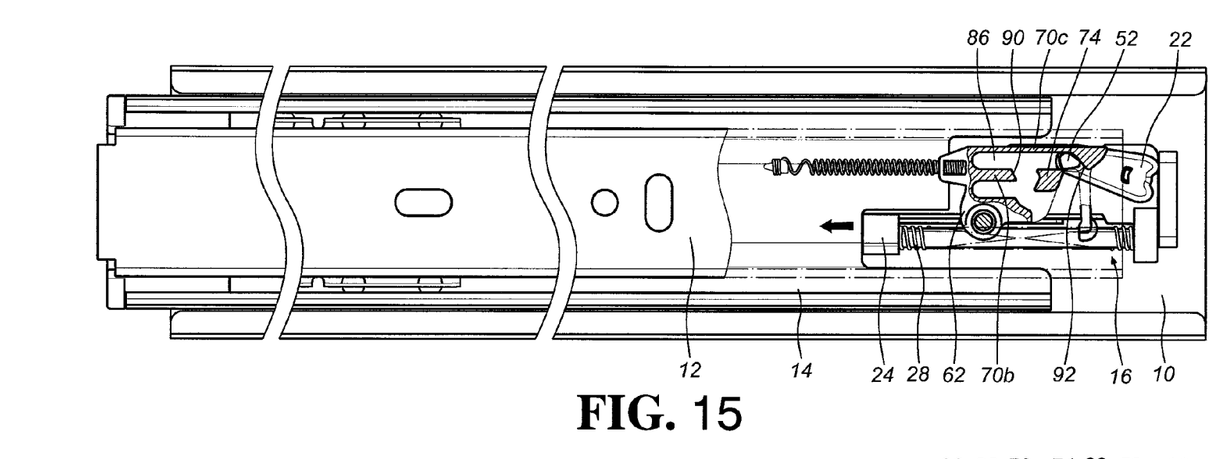
FIG. 15 shows that a push force is released and the pin portion of the swing member is disengaged from the block of the engaging member.
Figure 16:
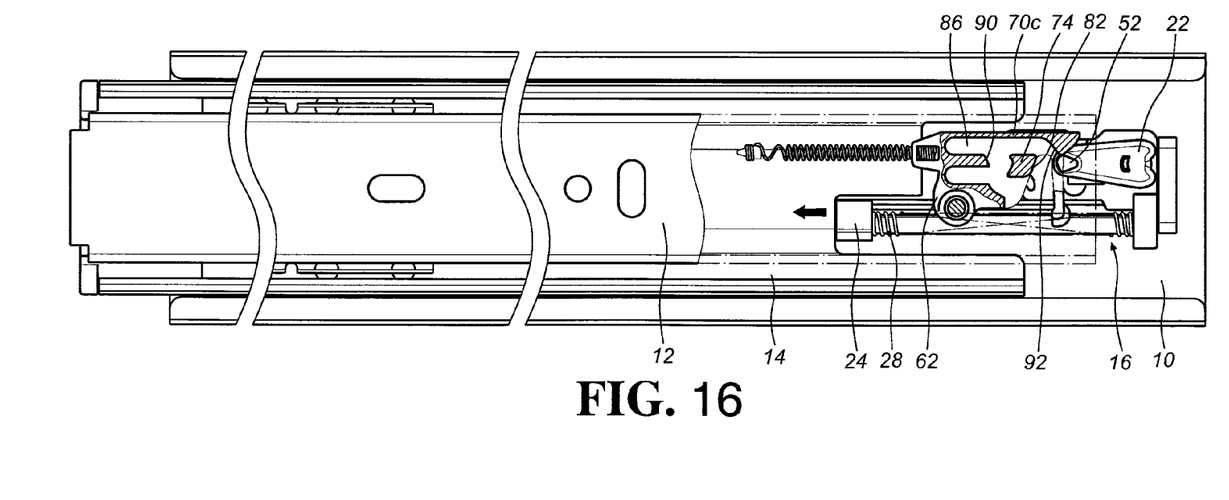
FIG. 16 shows the continuing action followed by the action disclosed in FIG. 15.

FIGS. 13 to 16 show that a push force F2 is applied to the second rail 12 to make the second rail 12 automatically opens relative to the first rail 10. When the second rail 12 is pushed inward, the engaging member 62 will move along with the movement of second rail 12 relative to the opening unit 16 of the first rail 10. The pin portion 52 of the swing member 22 is guided by the second guide surface 90 of the second wall 70b of the engaging member 62 and enters into the second slot 86 of the engaging member 62, as shown in FIGS. 13 and 14, to release the engagement between the engaging member 62 and the pin portion 52 of the swing member 22. When the second rail 12 is released, as shown in FIG. 15, the pusher 24 is applied by the released force of the first resilient member 28 to pop out the second rail 12. In this embodiment, the pusher 24 pushes the third rail 14 first and the second rail 12 is also moved outward. The pin portion 52 of the swing member 22 moves along the second slot 86 of the engaging member 62 and is guided by the third guide surface 92 of the third wall 70c to disengage the pin portion 52 from the second slot 86. The pin portion 52 is then located in the guide portion 82 of the block 74 of the engaging member 62 as shown in FIG. 16.

Figure 17:
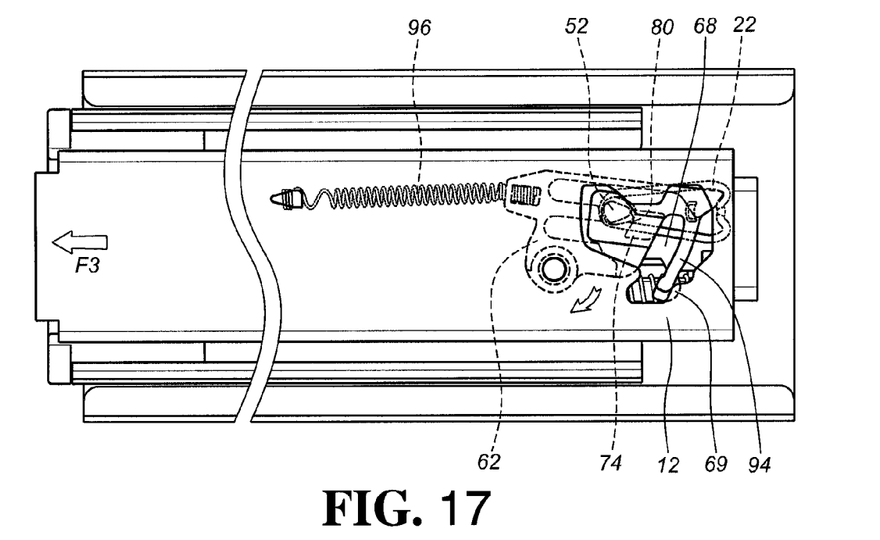
FIG. 17 shows that an improper pull force is applied to disengage the pin portion of the swing member from the block of the engaging member.
Figure 18:
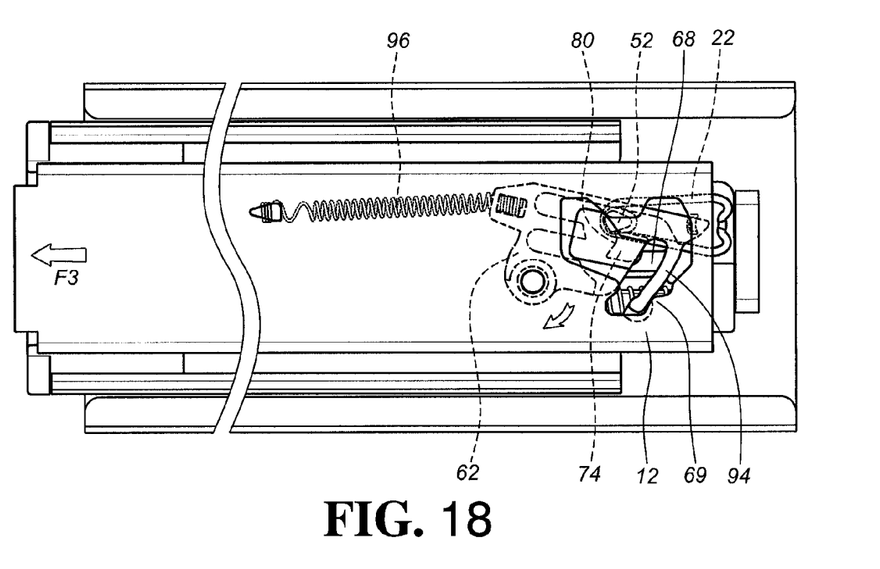
FIG. 18 shows the continuing action followed by the action disclosed in FIG. 17.

As shown in FIGS. 17 and 18, when the slide assembly is operated in an improper way, a force F3 is used to pull the retracted second rail 12 out from the first rail 10. Because the main positioning force for positioning the engaging member 62 on the second rail 12 comes from the engagement of the positioning leg 94 and the protrusion 69 of the second contact portion 68, so that when the pull force F3 is large enough to separate the second rail 12 from the first rail 10, the engaging member 62 is forced to pivot an angle and the engaging surface 80 on the block 74 is disengaged from the pin portion 52 of the swing member 22. The positioning leg 94 is deformed and the second resilient member 96 is extended to store two respective forces. When the forces are released, the engaging member 62 returns to its original position relative to the second rail 12 and is maintained at the position. Therefore, when the improper action is applied to the slide assembly to pull the second rail 12 away from the first rail 10, the parts of the opening unit 16 or the engaging unit 18 are not damaged.

It is noted that if the slide assembly is a two-step slide assembly, the opening unit 16 and the engaging unit 18 are respectively connected to the first rail 10 and the second rail 12. When the second rail 12 is retracted relative to the first rail 10, the opening unit 16 is engaged with the engaging unit 18 to keep the retracted status of the slide assembly. When pushing the second rail 12 to be slid out from the first rail 10, the engaging unit 18 is disengaged from the opening unit 16, and the second rail 12 is slid out from the first rail 10 a distance by the force of the opening unit 16.

The mechanism for preventing the parts from being damaged of the slide assembly is made possible by pivotably connecting the engaging member 62 of the engaging unit 18 on the second rail 12 and the engaging member 62 engaged with the positioning leg 94 and the second resilient member

96. The engaging member 62 is maintained at a fixed position when the slide assembly is in normal status, when an improper force is applied, the engaging member 62 overcomes the two respective forces of the positioning leg 94 and the second resilient member 96 and returns to its original position to keep the opening unit 16 in a normal operatable status.

While we have shown and described the embodiment in accordance with the present invention, it should be clear to those skilled in the art that further embodiments may be made without departing from the scope of the present invention.

What is claimed is:

1. An opening device for a slide assembly, comprising:
   a first rail;
   a second rail which is movable in longitudinal direction relative to the first rail;
   a stationary member fixed to the first rail and comprising a first end and a second end which is located opposite to the first end, a longitudinal portion located between the first and second ends;
   a swing member pivotably connected to the second end of the stationary member and comprising a pin portion;
   a pusher longitudinally connected to the longitudinal portion of the stationary member;
   a first resilient member connected to the pusher;
   an engaging member pivotably connected to the second rail and comprising a first end and a second end which is located opposite to the first end, a first wall, a second wall, a third wall, a connection wall, a block and a positioning leg located between the first and second ends, the connection wall extending from the first end and connected to the first wall, the second wall and the third wall, the first wall and the block defining a first path, the block and the third wall defining a second path, the block having an engaging surface and a guide portion defined in two ends thereof, the first wall, the second wall and the connection wall defining a first slot, the second wall, the third wall and the connection wall defining a second slot which faces the second path, the first wall comprising a first guide surface facing a portion of the first path, the first path located corresponding to a portion of the first slot, the second wall comprising a second guide surface facing the engaging surface of the block, the engaging surface having an inclined surface extending therefrom which faces a portion of the first slot, the third wall comprising a third guide surface, the positioning leg extending from the second end of the engaging member and contacting a portion of the second rail, a second resilient member connected between the first end of the engaging member and the second rail, and when the second rail is retracted relative to the first rail, the engaging surface of the block of the engaging member is engaged with the pin portion of the swing member, when the second rail is pulled out relative to the first rail, the engaging member overcomes a force between the second resilient member and the positioning leg, and pivots on the second rail, the engaging surface of the block of the engaging member is disengaged from the pin portion of the swing member, the positioning leg and the second resilient member return the engaging member relative to the second rail.

2. The device as claimed in claim 1, further comprising a third rail which is longitudinally slidable between the first and second rails.

3. The device as claimed in claim 1, wherein the longitudinal portion includes a groove in the stationary member so as to form a rail body, the longitudinal portion includes a recessed installation portion and the pusher includes a guide slot with which the rail body is engaged.

4. The device as claimed in claim 1, wherein the second end of the stationary member has a base portion extending therefrom which includes a hole and the swing member has a shaft which is pivotably connected to the hole.

5. The device as claimed in claim 1, wherein the second end of the stationary member has a restriction portion extending therefrom which includes a restriction slot and the swing member has a tongue which is inserted into the restriction slot.

6. The device as claimed in claim 1, wherein the swing member has a reinforcement member extending through the pin portion.

7. The device as claimed in claim 1, wherein a connection member is connected to the stationary member and includes a link and a head which is fixed to an end of the link, the first resilient member is mounted to the link and the pusher includes an aperture through which the link extends so that the pusher is biased by the first resilient member.

8. The device as claimed in claim 1, wherein the engaging member includes first contact portion and the second rail includes a second contact portion which is located corresponding to the first contact portion, the first contact portion contacts a portion of the second contact portion.

9. The device as claimed in claim 1, wherein the second rail includes a second contact portion which includes a protrusion and the positioning leg contacts the protrusion.

\* \* \* \* \*